United States Patent [19]
Reardon et al.

[11] Patent Number: 5,636,223
[45] Date of Patent: Jun. 3, 1997

[54] METHODS OF ADAPTIVE CHANNEL ACCESS ATTEMPTS

[75] Inventors: Karl A. Reardon, Surrey; Bud Fraser, Vancouver, both of Canada

[73] Assignee: Motorola, Inc., Schaumburg, Ill.

[21] Appl. No.: 495,276

[22] Filed: Jun. 27, 1995

[51] Int. Cl.[6] .................................................. H04L 12/413
[52] U.S. Cl. ............................ 370/431; 370/448; 370/459
[58] Field of Search ................................. 370/85.3, 85.6, 370/85.7, 85.8, 95.1, 95.2, 431, 433, 442, 443, 444, 445, 447, 448, 458, 459, 461, 462; 340/825.51, 455; 455/34.2, 58.1

[56] References Cited

U.S. PATENT DOCUMENTS

| | | | |
|---|---|---|---|
| 4,534,061 | 8/1985 | Ulug | 455/34.2 |
| 4,747,101 | 5/1988 | Akaiwa et al. | 455/34.2 |
| 5,353,287 | 10/1994 | Kuddes et al. | 370/85.3 |
| 5,361,063 | 11/1994 | Jaffe et al. | 370/85.6 |
| 5,483,533 | 1/1996 | Kuba | 370/85.3 |

*Primary Examiner*—Benedict V. Safourek
*Attorney, Agent, or Firm*—Charles W. Bethards; Kevin A. Buford

[57] ABSTRACT

In a data communication system (100) including infrastructure (101) arranged to communicate with a plurality of terminals (103) over a channel (109), a method of adaptable channel access practiced at a terminal (103) including determining an access priority value (303), responsive thereto ascertaining when the channel is available (305), and then executing a channel access attempt (307). The access priority value is determined with information received by the terminal or information available to the terminal.

12 Claims, 3 Drawing Sheets

ACCESS PRIORITY VALUE

| | | TERMINAL PRIORITY → | | | |
|---|---|---|---|---|---|
| | | 0 | 1 | 2 | 3 |
| CHANNEL PRIORITY LEVEL ↓ | 0 | HI | HI | HI | HI |
| | 1 | LOW | HI | HI | HI |
| | 2 | LOW | LOW | HI | HI |
| | 3 | LOW | LOW | LOW | HI |

METHODS OF ADAPTIVE CHANNEL ACCESS ATTEMPTS

FIELD OF THE INVENTION

The instant disclosure deals with communication systems and more particularly but not limited to methods of adaptive channel access having applicability in data communication systems.

BACKGROUND OF THE INVENTION

Multiple access communication systems are designed to provide access to limited communication resources, such as a channel, by a plurality of communication terminals for the purpose of exchanging communication messages, referred to variously as packets, data packets, messages, etc., between an infrastructure or network and the terminal. The access methodology, referred to as a multiple access protocol, is chosen such that some appropriate set of performance constraints are met. Typical performance constraints include efficiency of communication resource use, communication message delay, and other similar factors.

Multiple access protocols can generally be regarded as belonging to one of two types, contention and non-contention. Non-contention protocols are designed such that a terminal desiring to send a packet is permitted exclusive use of a communication resource or channel. One example of this type of protocol is time-division multiple access (TDMA) where the communication resource or channel is divided into a plurality of time frames that are further subdivided into a plurality of time slots and each terminal is assigned exclusive use of one or more time slots in each time frame.

This type of protocol is inefficient for terminals that infrequently source or generate messages since the assigned time slot is idle or unused by anyone most of the time. The practical number of terminals that can be accommodated by such a protocol is also limited by the delay incurred while waiting for one's assigned slot. This wait usually increases proportionally to the number of terminals that have assigned slots.

Contention protocols are characterized by terminals that actively compete or contend with each other to gain access to the communication resource or channel. The slotted ALOHA protocol is an example of this type of protocol. In slotted ALOHA, a communication resource or channel is divided into a plurality of time slots. A terminal desiring to send a packet may transmit in the first subsequent time slot, taking care not to transmit outside of the boundaries of that time slot. If no other terminal also transmitted in that same time slot, the packet transmission is considered successful. Note that other factors, such as communication channel noise, may ultimately result in a failure of the message, but that these other factors are not related to the access protocol. If one or more other terminals, however, did transmit a packet in the same time slot, all transmissions, ignoring capture and the like effects would fail due to collision. Thus contention protocols generally work well for lightly loaded systems, but performance suffers as load increases because the likelihood of collisions also increases. Further, communication messages longer than the time slot duration must be sent in a plurality of time slots and are subject to collision in each time slot used.

Reservation protocols, a sub-class of contention protocols, are also known. Reservation protocols attempt to combine certain aspects of contention and non-contention protocols to provide improved performance for a wider variety of communication system conditions. A typical reservation protocol divides a communication resource or channel into a series of fixed-size time frames further divided into a series of time slots. The time slots are comprised of two types, a reservation time slot and a data time slot, with varying numbers of each in each time frame. The reservation time slots are often significantly smaller than the data time slots and are typically grouped together at the beginning of each time frame.

A terminal desiring access to the communication resource or channel contends or, in pure ALOHA, transmits randomly in one of the reservation time slots for the purpose of reserving an associated data time slot. If the unit successfully avoids collision or successfully contends i.e. is the only unit to transmit a reservation request in a given reservation time slot, it is permitted exclusive access to an assigned or associated data time slot occurring later in the time frame. Although reservation protocols improve the effectiveness by which a communication resource or channel may be utilized by a plurality of competing terminals, particularly when the reservation requests are significantly shorter than the average message lengths, some drawbacks exist with these schemes.

A communication unit or terminal desiring access to the channel must first wait for the reservation time slots. If no messages are currently being sent, this represents a delay which would not have occurred if the terminal had been allowed to transmit immediately, in random access fashion. Further delay is encountered between the time the terminal successfully accesses the reservation time slot, via random access, and the time it receives confirmation of its reservation.

Additionally, even with the reservation protocols all terminals must still contend for the uplink or inbound channel under some conditions. To further improve this aspect various contention management algorithms have been proposed and used. In particular Carrier Sense Multiple Access (CSMA) is a contention management scheme where the terminals seeking to access the channel must first confirm that the channel is idle, i.e. not busy prior to requesting access. In circumstances where the terminals do not see, that is can not monitor, the channel that they are contending for, such as many wireless communications systems, a technique known as Digital Sense Multiple Access (DSMA) is often used. In this approach the infrastructure monitors the contended for channel and communicates information corresponding to the state of the channel, such as busy or idle, to the terminals on the downlink or outbound channel. Note that some method of feedback to the terminal regarding the success or failure of access requests is necessary in order for these protocols to be effective.

Another known embellishment to access protocols is a contention management mechanism that includes a random time delay having a normal distribution with a fixed upper bound. This random delay is initiated prior to an access attempt under circumstances where multiple terminals will be contending with virtual certainty for the channel. This upper bound on the random time delay is a design constant for all terminals in a given communication system. A contending terminal looks for the channel idle indication and transmits, a packet or access request packet or alternatively sees a channel busy indication and waits a random time prior to looking again. In other words, the terminal waits a random time before transmitting and this reduces the probability of a collision with a transmission from another terminal.

While the random delay is an effective contention management mechanism or process under some circumstances, it fails when either the channel is heavily or lightly loaded and under various other circumstances, such as load differentiation or management, encountered in state of the art systems. If such circumstances are encountered the results may be suboptimum or inefficient use of the channel or long delay times between transmissions. For example, if the number of terminals drops in a given system, the terminals contending for a channel may wait an unnecessarily long time to transmit. Since the number of terminals had decreased, the probability of transmissions colliding also had decreased. However, the terminals will continue to wait the random times dictated by the fixed design constant and therefore not allow efficient utilization of the channel resources. On the other hand, if the number of users becomes significantly large, transmission collisions will become more frequent as the terminals contend for channel access. Unless the probability values used by the terminals is such that no collisions could be avoided by choosing different probability values, the system is not operating at the most efficient level.

Accordingly, there is a need for an adaptive channel access technique which will enable the efficient utilization of communication resources.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Generally the present invention deals with methods of channel acquisition or adaptive access attempts in a communications system or more specifically methods of adaptively facilitating channel acquisition in a data communications system. Generally the data communications system includes infrastructure, such as base stations and network controllers and the like all arranged and constructed to communicate with a plurality of terminals, such as wireless modems, portable or mobile data terminals or computers with wireless connectivity or the like, over a channel, preferably a radio wave channel but alternatively a wired channel, such as coaxial media or the like. A preferred method embodiment of adaptable channel access is practiced at a terminal and includes determining an access priority value, ascertaining, responsive to the access priority value, when the channel is available, and then executing a channel access attempt.

The access priority value may be derived based on access information received from, for example, the infrastructure, such as information corresponding; to a number of terminals registered for service, to a channel loading factor, to a system management parameter, to a channel priority level or change thereto, or the like, either singularly or in combination. Additionally the access priority value may be a function of information available to the terminal alone, such as a number of channel access attempts, a terminal priority, a change in channel priority or the like. Ultimately and preferably the access priority value is used to select an upper boundary on a random timer that must time out prior to the terminal attempting to ascertain whether the channel is busy, i.e. not available, after once having so determined. After ascertaining when the channel is available, albeit following a procedure that is adapted to the access priority value as above, the method culminates with executing a channel access attempt, the attempt accordance with reasonably well known techniques and procedures, such as slotted DSMA, etc.

A similar and alternative method embodiment operates in a similar setting and is practiced by the infrastructure. This method of facilitating adaptable channel access by the terminal, includes determining a system priority level, and sending a message that provides access information corresponding to the system priority level. This access information includes or corresponds, for example, to a channel status, a number of terminals registered for service, a channel loading factor, a system management parameter, such as a channel priority level or change thereto. It should be noted that any information may be used in combination to derive an appropriate access delay or probability of access depending on system specifics and experimental determinations.

Figure 1:
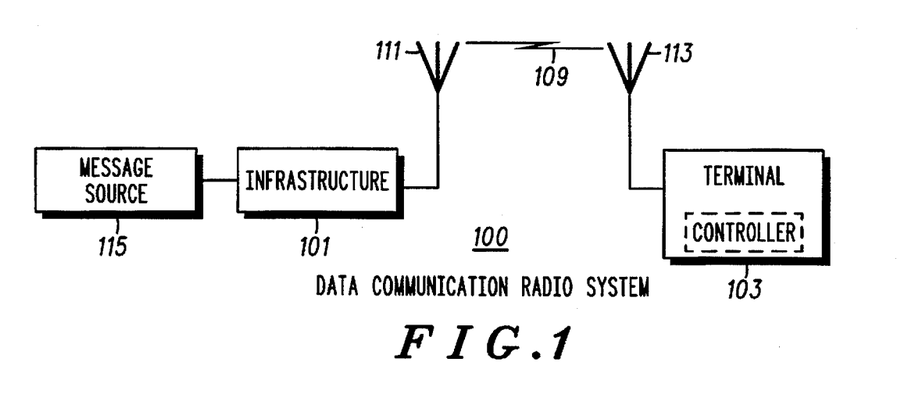
FIG. 1 is a block diagram of a wireless data communications system suitable for employing an embodiment in accordance with the instant invention.

The instant invention can be more fully described, thus appreciated, with reference to the figures in which FIG. 1 depicts a data communications system (100). The data communications system (100) includes a message source (115), such as a public switched telephone or data network, shown coupled to an infrastructure (101). The infrastructure (101) includes, in a preferred form, a transceiver or base station coupled to an antenna (111) and operating to receive and transmit radio signals over a channel (109), such as a radio channel. The radio signals are transmitted from or received by an antenna (113) that is coupled to a data terminal (103) or terminal. The data terminal (103) operates to receive and convert radio signals into data messages and vice a versa in addition to establishing and maintaining the link via the channel (109) with the infrastructure (101).

It should be noted that while FIG. 1 depicts only one channel, one data terminal, and one infrastructure antenna or base station, a practical system may include a plurality of each. Generally the data communications system (100) is intended to supply specific messages to/from specific terminals in a largely transparent (to end users) fashion. Although FIG. 1 depicts the preferred wireless or radio data communications system, the instant invention is expected to have equal applicability to wired data communications systems. Additionally the instant invention is expected to have applicability to data communications regardless of the specific form the data terminal may take.

Figure 2:
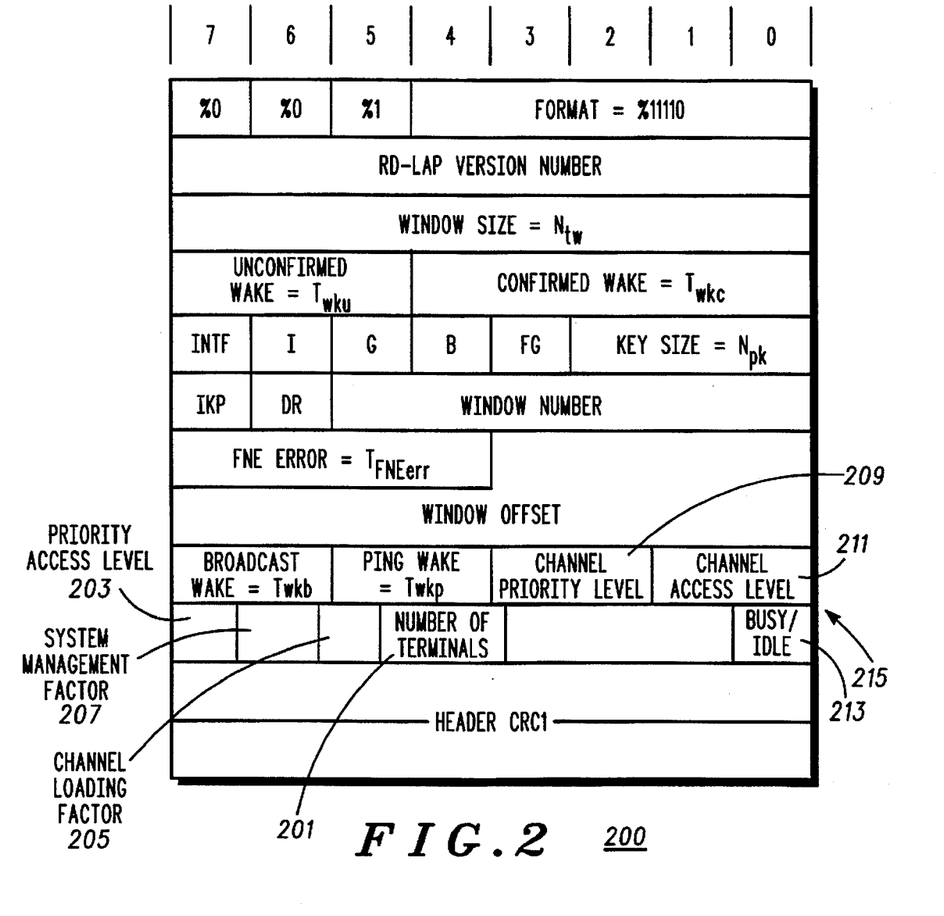
FIG. 2 is a representation of a message suitable for use in a preferred method embodiment in accordance with the instant invention.

Referring to the FIG. 2 representation of a message suitable for use in a preferred embodiment, a message (200) is depicted. In the preferred embodiment, specifically a Radio Data Link Access Procedure (RD-LAP) system available from Motorola, the message (200) is similar to the SYNC message within RD-LAP and contains various other system parameters. The message (200) will be broadcast from time to time, such as at the beginning of each frame but could be also broadcast in a similar or different form when the infrastructure has no other information to send to one or more terminals, on the downlink or infrastructure to terminal rather than uplink or terminal to infrastructure portion of the channel. All terminals will receive this message and it's contents allow each terminal to make various configuration decisions so as to facilitate further operation on the system. The other system parameters contain various information, such as version numbers, that will take forms depending on the particular system, are generally well known, and are not material to nor further discussed within this disclosure.

However, the message also includes, among other data, a channel status bit (213), specifically a busy/idle bit that preferably is included in all or nearly all messages on the downlink channel, and a system priority level (215). The busy/idle bit is used by the terminals to determine whether the channel is presently busy or idle pursuant to purposes further discussed below. The system priority level further includes access information, corresponding to: a number of registered terminals on the system (201), a system designated access priority value or priority access level (203), a channel loading factor (205), a system management parameter (207), a channel priority level (209), a channel access level (211), or the like either singularly or in combination as circumstances dictate.

The number of registered terminals is useful in deriving the priority access value since as the number of terminals (103) increases the probability of a collision during a channel access attempt also increases. Therefore the priority access value can be decreased at the terminal as the number of terminals (103), reflected by the number of registered terminals information (201) is increased. Alternatively, systems are contemplated where this information field (201) includes a vector of information regarding the number of terminals registered. This vector can be a series of probability or priority values and these values then correspond to the number of terminals, currently registered, having, for example, a given level of priority. Anecdotally, a public safety user wishing to send an emergency message would select the value within the vector that provides the greatest probability or assurance of access to the channel, whereas a lower priority terminal would be constrained to a lower priority value.

The priority access level (203) is designated by the infrastructure (101) and sent or broadcast by the infrastructure over the downlink portion of the channel to the terminals. This priority access level (203) or relevant portion thereof will simply be accepted as the priority access value by the terminal (103). This level may be expected to vary in an inversely proportional manner to the number of terminals (103). The priority access level (203) under some circumstances may be a vector of priority values which correspond to a system derived priority number that a user of a terminal can select to correspond to the urgency of a message or the user's willingness to pay for higher or lower service levels. In this case a user regardless of or in addition to being constrained by the priority of his particular terminal can have a message with a user determined urgency or importance delivered, albeit likely subject to a different user fee.

The channel loading factor (205) is an indicator of how much radio traffic is occurring on the channel for the data communication system (100). The channel loading factor differs from the number of registered terminals on the system (201) in that there may be several terminals that are registered on the data communication system but a large number of those terminals are not attempting to access the channel.

The System Management parameter (207) is one or more bits that the infrastructure may choose to set which indicate various system circumstances during which the terminals are expected to behave differently. These parameters indicate such events as a busy time period for the system, during which terminals are expected to change their respective priority access values, or a new or different channel becoming active thereby risking a large number of registration or access attempts. Other examples of this parameter include being set as a result of a load shedding algorithm having directed a large number of terminals to a new channel and the resultant excessive load of access attempts for that channel or it may indicate a system wide emergency condition such as might be encountered in the event of a national emergency on some systems with an attendant desire to provide some users with an enhanced or decreased chance or probability of access.

The infrastructure (101) may also send a channel access level (311) in order to set a threshold for the system or set thresholds on particular channels (109). This value allows the infrastructure to set a minimum value for the priority of a terminal that is allowed to access the channel regardless of other circumstances. The infrastructure thus can directly prioritize higher priority users, such as public safety, or terminals ahead of lower priority terminals, such as pizza delivery, with this indicator.

The channel priority level (309) is a value used by the terminal (103) to determine a priority access value. In the preferred method, discussed below in further detail, the channel priority level is a two bit value sent by the infrastructure as part of the access information in the message (300).

Referring to the FIG. 3 flow chart a preferred method embodiment of adaptable channel access will be described. It is assumed that any hard rules governing channel access, such as having a terminal priority equal to a greater than the channel access level have been satisfied prior to the method of FIG. 3 being undertaken. Channel access and channel acquisition refers to any mechanism that allows a terminal (103) to be recognized by the infrastructure (101) as a valid user of the system and which allows the terminal to utilize the channel (109) for transmission of data messages. Generally the FIG. 3 process is suitable for implementation according to well known techniques in any general purpose controller executing appropriate operating software that is suitable for providing that type of function in a terminal or data terminal having a receiver, etc. An example of such a terminal is the InfoTAC™ data terminal available from Motorola, Inc. that uses a controller based on the Motorola MC 68300 series processor together with the MC 56000 digital signal processor.

Figure 3:
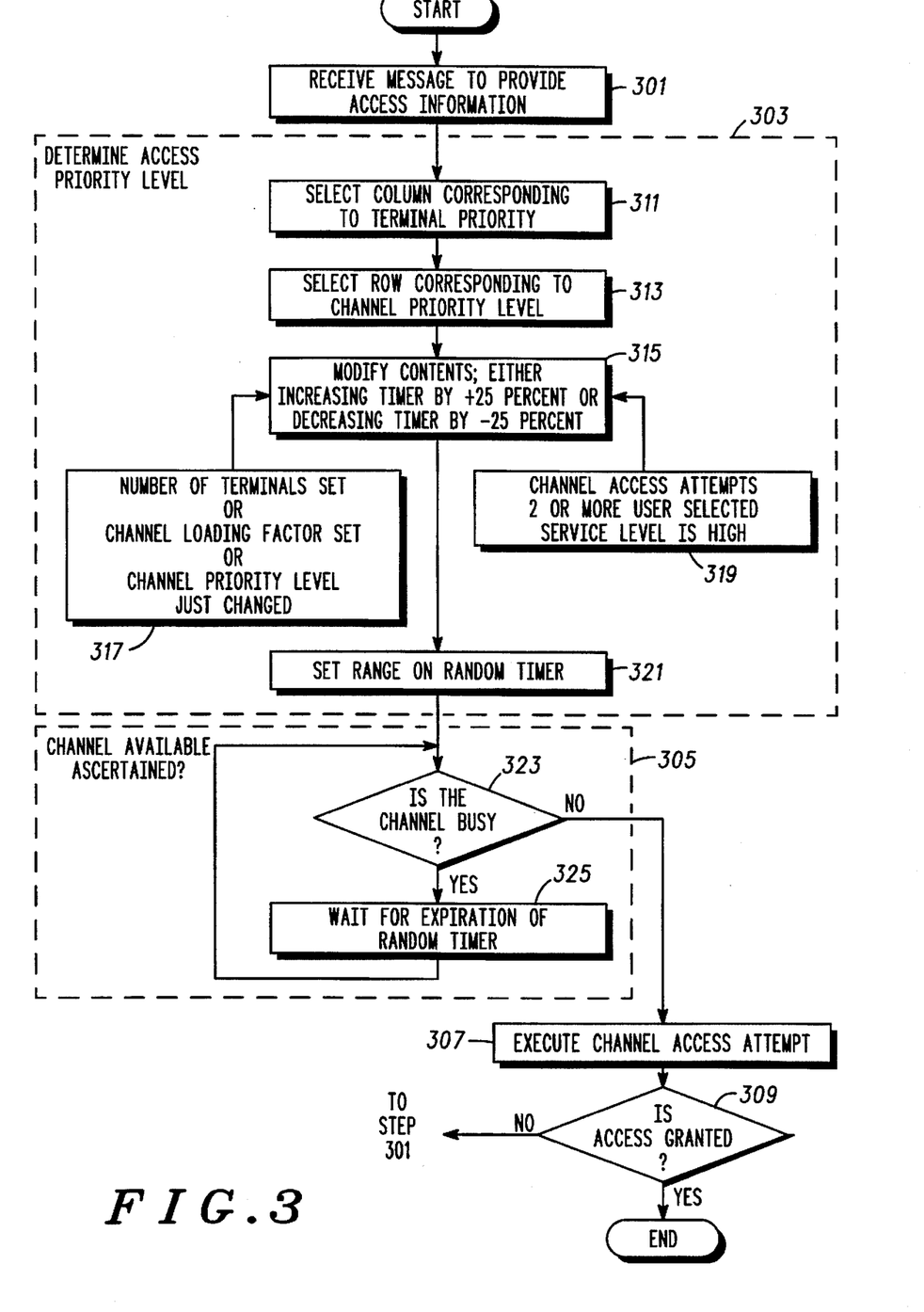
FIG. 3 is a flow chart of the preferred method of adaptable channel access in accordance with the instant invention.

In order for the terminal (103) to gain access to the channel (109), the terminal (103) follows the preferred method of adaptable channel access depicted in FIG. 3. The terminal (103) practices the preferred method by initially receiving a message to provide access information including one or more of the values discussed in conjunction with the message of FIG. 2, at step (301). Then, at step (303), a determination of an access priority value is undertaken. Thereafter, step (305) ascertains, responsive to the access priority value, when or whether the channel (109) is available. If so, step (307) executes a channel access attempt that if successful, as determined at step (309), ends the process and if not successful the method begins again at step (301). Several methods may be used to determine or derive the priority access value including calculation, using look up tables, or a combination of both.

Step (303) from an overview perspective is a combination approach and begins by selecting the contents at a location in a look-up table and then modifying those contents in accordance with various other factors, some known only for example to the terminal and others having been received in the message of step (301). Step (311) selects a column in a look up table such as table (400) of FIG. 4, where the column, such as column (401) corresponds to the priority, here priority 1 with "0" being the lowest and "3" being the highest as depicted, of the terminal practicing the method. Similarly step (315) selects a row of table (400), namely row (403) with priority 2 again ranging from a low priority of "0" to a high of "3", that corresponds to the channel priority level.

Figure 4:
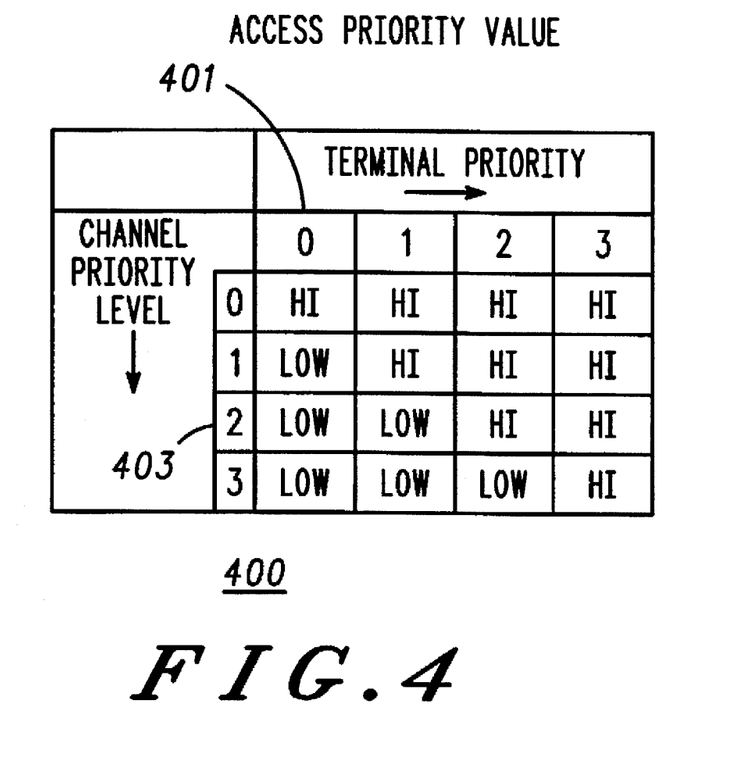
FIG. 4 is a look-up table suitable for use with the preferred method of FIG. 3.

In the preferred embodiment the look up table has two possible contents, specifically "Hi" equal to 500 milliseconds (ms) and "Low" equal to 1000 ms. Step (315) selects the value from table (400) at the intersection of columns (401) and row (403), here "Low" or 1000 ms and then modifies this value by increasing the value by 25% or decreasing the value by 25% in accordance with which of the factors listed in steps or boxes (317) and (319), respectively, are true. For example, given the 1000 ms value an increase or decrease is 250 ms and given the Hi priority value of 500 ms the magnitude of the modification is 125 ms. Factors generating an increase from step (317) include whether a bit was set, from the FIG. 2 message, indicating the number of terminals registered on the channel was higher than normal, or if the bit signifying channel loading was abnormally high is set or whether the channel priority level has recently changed.

Experimentally it has been observed that the number of terminals bit should be set when a preset system configurable parameter, such as 1000 terminals is exceeded. The precise value will depend on the traffic or message generating profile for a specific population of terminals and the system operator's desired service level. Generally the number of terminals registered is an indication of potential system load while chanel loading is an indication of present actual load. The bit signifying channel loading should be set when loading above 80% of maximum channel throughput is observed. This is usually synonymous with the point where average message latency begins to increase significantly as well understood in the art.

Factors resulting in a decrease in the table value, depicted in step (319), include determining whether this channel access attempt follows prior unsuccessful ones and what service level the user has chosen. As will be evident to those skilled in the art the preferred embodiment is relatively simple and straight forward and may be modified in many ways including, for example, more than a binary indication for the parameters of steps (317) and (319) or the contents of the look table (400). Many of the values will necessarily be determined by experiment and depend on the relative importance of various system performance criteria in a given set of circumstances.

In any event the resultant value from step (315) is preferably, the access priority value and will be used at step (321) to set the range or maximum value for a random timer that is uniformly distributed between "0" ms and this maximum value. Thereafter step (305) ascertains a random time, responsive to the access priority value, and tests whether the channel is available when the random time has expired at step 323. This is tested by checking the channel status or busy/idle bit (215). If the channel is busy then step (325) waits for a random time corresponding to the access priority value or specifically the range of the random timer from step (321).

After expiration of this random time the method again checks or rechecks for a channel busy a step (323). Eventually the channel will be idle or available and then step (307) executes a channel access attempt after which the method ends or repeats as discussed above. Generally, a higher priority terminal practicing this method will have a higher probability of successfully accessing the channel than a lower priority terminal simply because the higher priority terminal looks more often to determine whether the channel is busy and is therefore more likely to find it idle.

This random delay redistributes the subsequent access of multiple contending terminals into the future. This in turn reduces the collision potential and prevents the terminals from accessing the channel in lock step. This approach of having an adaptable delay or random backoff has many advantages over methods heretofore used, including a more continuous approach to managing contention when compared to a hard rule of disallowing terminals below a certain priority level. Additionally user seem to be more receptive to a relatively continuous lowering of their respective service priority as compared to a hard rule where they are totally denied service.

It will be apparent to those skilled in the art that the instant disclosure provides an exemplary method of adaptable channel access that is responsive to many of the system load variations that make previously used contention management algorithms suboptimum from an efficiency perspective as well as user satisfaction perspective. The instant invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a data communication system including infrastructure arranged to communicate with a plurality of terminals over a channel, a method of adaptable channel access practiced at a terminal comprising the steps of:

determining an access priority value;

ascertaining a random time, responsive to said access priority value;

testing whether said channel is available;

if said channel is not available, waiting for said random time to expire and repeating said step of testing; and executing, responsive to said step of testing, a channel access attempt when said channel is available.

2. The method of claim 1 wherein said step of determining an access priority value further includes the steps of:

receiving a message to provide access information, and deriving, responsive to said access information, said access priority value.

3. The method of claim 2 wherein said step of receiving a message further provides said access information corresponding to a number of terminals registered for service.

4. The method of claim 2 wherein said step of receiving a message further provides said access information corresponding to a channel loading factor.

5. The method of claim 2 wherein said step of receiving a message further provides said access information corresponding to a system management parameter.

6. The method of claim 5 wherein said step of receiving a message further provides said system management parameter corresponding to a channel priority threshold.

7. The method of claim 1 wherein said step of determining an access priority value further includes a step of deriving said access priority value in accordance with a number of channel access attempts.

8. The method of claim 1 wherein said step of determining an access priority value further includes a step of deriving said access priority value in accordance with a terminal priority.

9. The method of claim 1 wherein said step of determining an access priority value further includes a step of deriving said access priority value in accordance with a change in channel priority threshold.

10. The method of claim 1 wherein said step of determining an access priority value further includes a step of deriving said access priority value in accordance with a user selected priority access level.

11. The method of claim 1 wherein said step of ascertaining further includes a step of receiving an indicator corresponding to the channel availability.

12. The method of claim 1 wherein said step of ascertaining when said channel is available further includes;

a step of checking to see if said channel is busy; if so waiting a random time that corresponds to said access priority value; and then rechecking whether said channel is busy.

* * * * *

US005636223C1

(12) EX PARTE REEXAMINATION CERTIFICATE (8175th)
United States Patent
Reardon et al.

(10) Number: US 5,636,223 C1
(45) Certificate Issued: Apr. 26, 2011

(54) METHODS OF ADAPTIVE CHANNEL ACCESS ATTEMPTS

(75) Inventors: Karl A. Reardon, Surrey (CA); Bud Fraser, Vancouver (CA)

(73) Assignee: Motorola Mobility, Inc., Libertyville, IL (US)

Reexamination Request:
No. 90/010,802, Dec. 28, 2009

Reexamination Certificate for:
Patent No.: 5,636,223
Issued: Jun. 3, 1997
Appl. No.: 08/495,276
Filed: Jun. 27, 1995

(51) Int. Cl.
*H04L 12/413* (2006.01)
*H04L 12/28* (2006.01)
*H04L 12/407* (2006.01)
*H04L 7/38* (2006.01)

(52) U.S. Cl. .................. 370/431; 370/448; 370/459
(58) Field of Classification Search .................. None
See application file for complete search history.

(56) References Cited

U.S. PATENT DOCUMENTS 4,979,168 A 12/1990 Courtois et al.

OTHER PUBLICATIONS

Ni et al., Prioritizing Packet Transmission in Local Multi-access Networks, ACM 0–89791–113–X/83/0010, 1983.
Ko et al., Simple priority scheme for Multichannel CSMA/CD local area networks, Communications, Speech and Vision, IEEE Proceedings I, Dec. 1990, pp. 365–370, vol. 137, Issue 6.
Kazakos, P. et al., Transmission Algorithms for a Multi-Channel Packet Radio System with Priority Users, IEEE, 1992.
Arora, R. et al., Prioritized Access in CSMA Networks: A Node Partitioning Approach, IEEE, 1998.

*Primary Examiner* — Maijd A. Banankhah (57) ABSTRACT

In a data communication system (100) including infrastructure (101) arranged to communicate with a plurality of terminals (103) over a channel (109), a method of adaptable channel access practiced at a terminal (103) including determining an access priority value (303), responsive thereto ascertaining when the channel is available (305), and then executing a channel access attempt (307). The access priority value is determined with information received by the terminal or information available to the terminal.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *